(12) United States Patent
Foerstner et al.

(10) Patent No.: US 7,765,042 B2
(45) Date of Patent: Jul. 27, 2010

(54) FAULT DIAGNOSTIC METHOD AND DEVICE

(75) Inventors: Dirk Foerstner, Stuttgart (DE); Reinhard Weber, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 76 days.

(21) Appl. No.: 10/860,463

(22) Filed: Jun. 3, 2004

(65) Prior Publication Data

US 2004/0254696 A1    Dec. 16, 2004

(30) Foreign Application Priority Data

Jun. 12, 2003    (DE)    ................................ 103 26 557

(51) Int. Cl.
*G01M 17/00*    (2006.01)
(52) U.S. Cl. .......................................... 701/33; 701/35
(58) Field of Classification Search ............. 701/29–35, 701/110, 115
See application file for complete search history.

(56) References Cited

U.S. PATENT DOCUMENTS

| | | | | |
|---|---|---|---|---|
| 4,472,780 | A * | 9/1984 | Chenoweth et al. ............. 701/4 |
| 5,067,099 | A * | 11/1991 | McCown et al. ............. 702/183 |
| 5,409,434 | A * | 4/1995 | Furukawa et al. ............. 477/131 |
| 5,505,674 | A * | 4/1996 | Furukawa et al. ............. 477/130 |
| 5,625,558 | A * | 4/1997 | Togai et al. .................... 701/93 |
| 5,749,059 | A * | 5/1998 | Walton ......................... 701/45 |
| 5,801,619 | A * | 9/1998 | Liu et al. ..................... 340/436 |
| 5,881,971 | A * | 3/1999 | Hickman .................... 244/1 R |
| 6,324,665 | B1 * | 11/2001 | Fay ............................. 714/736 |
| 6,513,885 | B1 * | 2/2003 | Salamat et al. ......... 303/122.09 |
| 6,871,127 | B2 * | 3/2005 | Dominke et al. .............. 701/43 |
| 6,885,922 | B2 * | 4/2005 | Yao et al. ...................... 701/29 |
| 2001/0027893 | A1 * | 10/2001 | Nishizaki et al. ............ 180/409 |
| 2001/0029408 | A1 * | 10/2001 | Murray et al. .................. 701/1 |

(Continued)

FOREIGN PATENT DOCUMENTS

EP    1 134 399    9/2001

(Continued)

OTHER PUBLICATIONS

"Fault detection of a diesel injection system by qualitative modelling," D. Foerstner, J.—Lunze, $3^{rd}$ IFAC Workshop Advances in Automotive Control, pp. 273-279, Karlsruhe, 2001.

*Primary Examiner*—Mark Hellner
*Assistant Examiner*—Ari M Diacou
(74) *Attorney, Agent, or Firm*—Kenyon & Kenyon LLP

(57) ABSTRACT

A method for monitoring motor vehicle systems that include mechanical components and at least one control device detects, in a first step, input signals and output signals as quantitative signals that characterize the operating behavior, assigns discrete qualitative values to value intervals of the input signals and output signals, which are established using a particular sequence of threshold values. A change to one of the qualitative values is recognized as an event, and consecutive events are stored as an event sequence. The event sequence is compared with a model of the normal behavior of the motor vehicle system, in particular a model composed of all event sequences of the proper operation of the motor vehicle system. If there is a match, it is assumed that the motor vehicle system is operating properly. If there is no match, erroneous operation is assumed.

19 Claims, 5 Drawing Sheets

U.S. PATENT DOCUMENTS

| | | | |
|---|---|---|---|
| 2002/0019690 A1* | 2/2002 | Kurishige et al. | 701/41 |
| 2002/0147558 A1* | 10/2002 | Seip et al. | 702/99 |
| 2002/0193935 A1* | 12/2002 | Hashimoto et al. | 701/110 |
| 2003/0019670 A1* | 1/2003 | Matz et al. | 180/6.2 |
| 2003/0037974 A1* | 2/2003 | Chernoff et al. | 180/65.2 |
| 2003/0057941 A1* | 3/2003 | Collier-Hallman et al. | 324/163 |
| 2003/0069673 A1* | 4/2003 | Hong et al. | 701/29 |
| 2003/0114969 A1* | 6/2003 | Dominke et al. | 701/41 |
| 2004/0186653 A1* | 9/2004 | Bleile et al. | 701/103 |
| 2004/0254696 A1* | 12/2004 | Foerstner et al. | 701/29 |
| 2004/0267424 A1* | 12/2004 | Yao et al. | 701/43 |
| 2005/0096835 A1* | 5/2005 | Piwonka et al. | 701/115 |
| 2006/0156073 A1* | 7/2006 | Fachinger et al. | 714/48 |

FOREIGN PATENT DOCUMENTS

| | | |
|---|---|---|
| WO | WO 01/88359 | 11/2001 |

* cited by examiner

FAULT DIAGNOSTIC METHOD AND DEVICE

RELATED APPLICATION INFORMATION

This application claims the benefit of and priority to German Patent Application No. 103 26 557.0, filed on Jun. 12, 2003 in Germany.

FIELD OF THE INVENTION

The present invention relates to a method and a device for monitoring systems in motor vehicles, such as fuel injection systems and electrical steering and braking systems.

BACKGROUND INFORMATION

Motor vehicle systems of this nature are composed of mechanical components and control devices that specify input variables, or manipulated variables, for the system and act as a functional unit. The system responds to these input variables with output variables that are usually determined using sensors. Characteristically, however, usually only a few output values are provided, for reasons of cost. Using the measured values provided by the sensors and the computing capacity provided in the control devices, these sensors and the control devices enable the system to be monitored during operation of the vehicle. As a result, a malfunction that could endanger the safety of the operation of the motor vehicle, e.g., in the case of a fault in an anti-lock braking system, or a malfunction that results in impermissible environmental impacts, such as a fault in a fuel injection system, is recognized, and a suitable notification is provided to the driver. If the type of fault can also be determined, it is possible, using an emergency program, to maintain limited operability, for example with reduced engine output or a deactivated anti-lock braking system.

In terms of monitoring motor vehicle systems of this nature, measured signals or output variables may be checked for adherence to signal limiting values and to subject them to a plausibility check based on manipulated variable signals or input variables. If a limiting value is exceeded, an alarm message is triggered, and a standalone diagnostic device or a diagnostic device that is integrated in the control device can detect faults and distinguish between types of fault, if applicable. If more than two signals are to be evaluated jointly, model-based methods in which the model reproduces the input-output behavior of the system offer advantages. A check is run to determine whether output signals measured at the motor vehicle system match the values to be expected based on specified input signals according to the model, or if they exceed or fall below stated limiting values.

When, in addition to a model of the expected correct behavior of the motor vehicle system, models of the behavior to be expected under certain fault conditions are also provided, certain faults can be detected and localized.

The disadvantage of the foregoing approaches is that the computing complexity required to process the given quantitative signals may be considerable. Accomplishing this in real time is therefore a very complex procedure.

A method for onboard diagnosis is referred to in the publication entitled "Fault detection of a diesel injection system by qualitative modelling," D. Foerstner, J.-Lunze, 3rd IFAC Workshop Advances in Automotive Control, pp. 273-279, Karlsruhe, 2001, this method combining a model-based diagnostic method with a qualitative modeling strategy.

Quantitative input and output signals of a dynamic system are converted to qualitative values. For this purpose, a series of threshold values up to a maximum value for the quantitative signal is specified. Each of the intervals that result is assigned to a qualitative value. If a qualitative value changes, and, therefore, the quantitative value on which it is based exceeds one of the threshold values, an event is triggered. The events are used to form an event sequence. These event sequences are compared with a complete model of event sequences. A complete model includes all possible event sequences. The state of the dynamic system can be evaluated by referring to the model.

The disadvantage of the diagnostic method made referred to in the publication is that many models of possible fault responses are incomplete and therefore cannot be used. High-frequency signal components and noise in the vicinity of threshold values can cause events to occur in rapid succession. Unnecessary computing capacity is therefore utilized without the possibility of obtaining any information as a result.

SUMMARY OF THE INVENTION

In contrast, the exemplary method according to the present invention, and the exemplary monitoring device, which utilizes the method, have the advantage that an incomplete model may also be utilized. Since many methods of obtaining models result in incomplete models, the complexity involved in creating the model is simplified. It is sufficient to develop a complete model for the normal case that corresponds to proper operation. The fault models may be incomplete, however.

Advantageously, a comparison with fault models is carried out or performed in the comparison step, the event sequences of the fault models being distinguishable from the event sequences of all other fault models and the normal model, and, if there is a match, the presence of a particular fault is recognized. For fault models that may be designed to be unambiguous in this manner, the type of fault may therefore be determined.

Advantageously, the presence of an unknown fault is recognized when at least two fault models or the normal model and at least one further fault model apply simultaneously. In this case, in which the fault models do not rule each other out correctly (this may result due to the type of model generation), an indeterminate fault message for a result that is due partly to random events may be preferred.

Advantageously, at least two consecutive results of the comparison are compared with each other once more and this comparison is taken into consideration in the determination as to whether a fault or a normal case is present. As a result, for example, for the case in which two different faults in immediate succession are determined to be the result, only one indeterminate fault is output as the result. When the case in which a change to the recognized fault is less likely than that of an incorrect fault determination, it may be more beneficial to obtain an undefined fault as the result. When the normal case follows a recognized fault, the normal case cannot be recognized using a comparison of this nature until it occurs a second time at the least.

Advantageously, the time that has elapsed since an event occurred is recorded as a further quantitative output signal. As a result, faults that come to light as a result of a deviating time response may also be recognized without additional expenditure, since no changes to diagnostic algorithms are required.

After the step of assigning the discrete qualitative values, a plurality of qualitative values may be combined to form one qualitative value that is capable of being assigned unambiguously to the original values, the qualitative values being combined in particular as a weighted sum. Since the qualitative values do not lose any information content as a result of this if the combined values are still capable of being assigned unambiguously, the subsequent formation of event sequences and the evaluation are simplified.

According to another exemplary method according to the present invention, for which protection is requested separately, in the assignment step, the threshold values of the value interval in which the quantitative value was previously located are reduced by a lower hysteresis value and increased by an upper hysteresis value. As a result of this measure, undesired rapid switching of the qualitative value is prevented when the quantitative value is close to a threshold value. This may occur due to high-frequency components or noise in the quantitative signal.

Advantageously, the method is utilized in a motor vehicle system that is a fuel injection device for internal combustion engines. The method may also be used advantageously with a braking system or a by-wire system. By-wire systems, in particular, such as a steering system without mechanical transfer of the steering commands or a braking system that includes no direct hydraulic connection between the brake pedal and wheel brakes, require reliable self-diagnostic capability.

DETAILED DESCRIPTION

Figure 1:
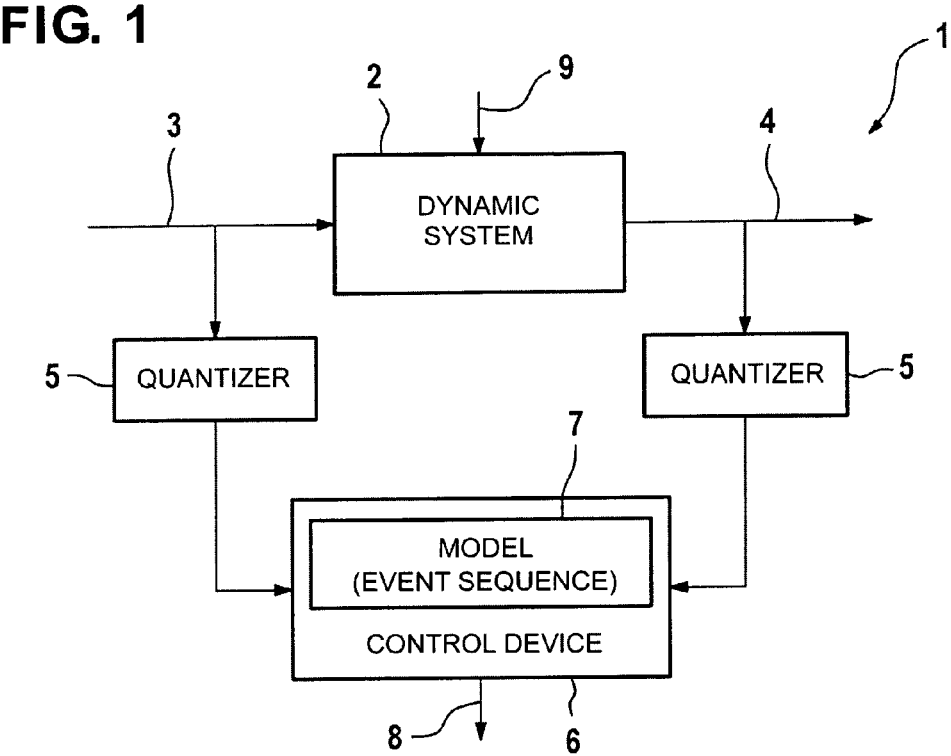
FIG. 1 shows, in a block diagram, the interaction of an exemplary embodiment and/or method according to the present invention with a motor vehicle system.

FIG. 1 shows, in a block diagram, the interaction of an exemplary method according to the present invention with a motor vehicle system 1. The motor vehicle system includes a substantially dynamic system 2 that is composed of mechanical components, mechatronics and/or further control electronics. Dynamic system 2 receives input signals 3 that are actuating signals for the regulation, for example, such as the pressure control with a common-rail injection system. Dynamic system 2 responds to these input signals 3 with output signals 4 that are obtained using sensors. Input signals 3 and output signals 4 are forwarded to a control device 6 via quantizers 5.

After quantizers 5, the signals are present as qualitative signals. One or more models 7 for the behavior of dynamic system 2 are stored in control device 6. In the simplest case, at least one model 7 for the normal case is present when dynamic system 2 functions as expected. The values and changes to the qualitative input signals and output signals are compared by control device 6 with the values predicted by model 7, and they are output after an evaluation as result 8.

If a fault 9 acts on dynamic system 2, output signals 4 change, and the qualitative output signals forwarded to control device 6 no longer correspond to the values and changes predicted by model 7 for the normal case.

Figure 2:
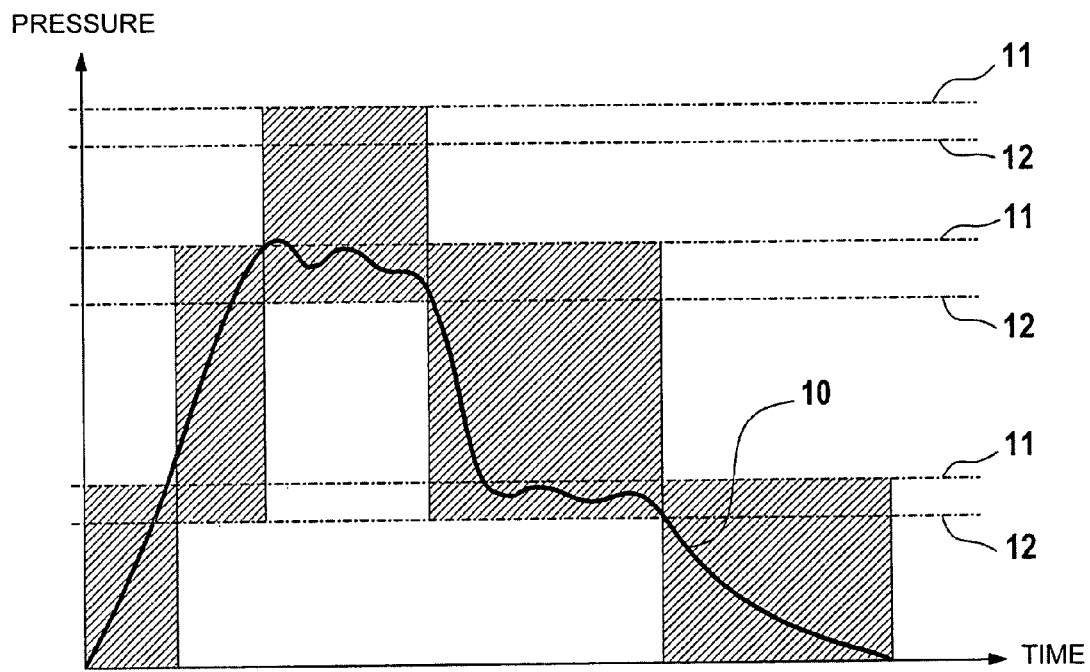
FIG. 2 shows, in a diagram, the assignment of qualitative values with a hysteresis in the case of an exemplary embodiment and/or method according to the present invention.

FIG. 2 shows, in a diagram, the assignment of qualitative values with a hysteresis in the case of a particularly advantageous embodiment of the method according to the invention. Time is plotted on the abscissa, and a signal is plotted on the ordinate, in this case the pressure measured in a common-rail system. The solid line represents pressure curve 10. Dashed lines 11 on the top each represent the threshold values that have been increased by one hysteresis value in each case, and dashed lines 12 on the bottom each represent the threshold values that have been reduced by one hysteresis value in each case. Five qualitative values are assigned in sequence to quantitative pressure curve 10, the qualitative values being one of three different values (1, 2, 3). The ranges of the qualitative values are illustrated using the vertical lines, which indicate their time limits, and using threshold values 11, 12, each of which is shifted by the amount of the hystereses.

In the two easily recognizable plateau regions of pressure curve 10, the pressure curve fluctuates, so that without lower threshold values 12, that have been shifted by the hysteresis, and upper threshold values 11, the assigned qualitative value would change many times.

A further adaptation may be provided when another lower and/or upper hysteresis value is assigned to each of the threshold values.

Figure 3:
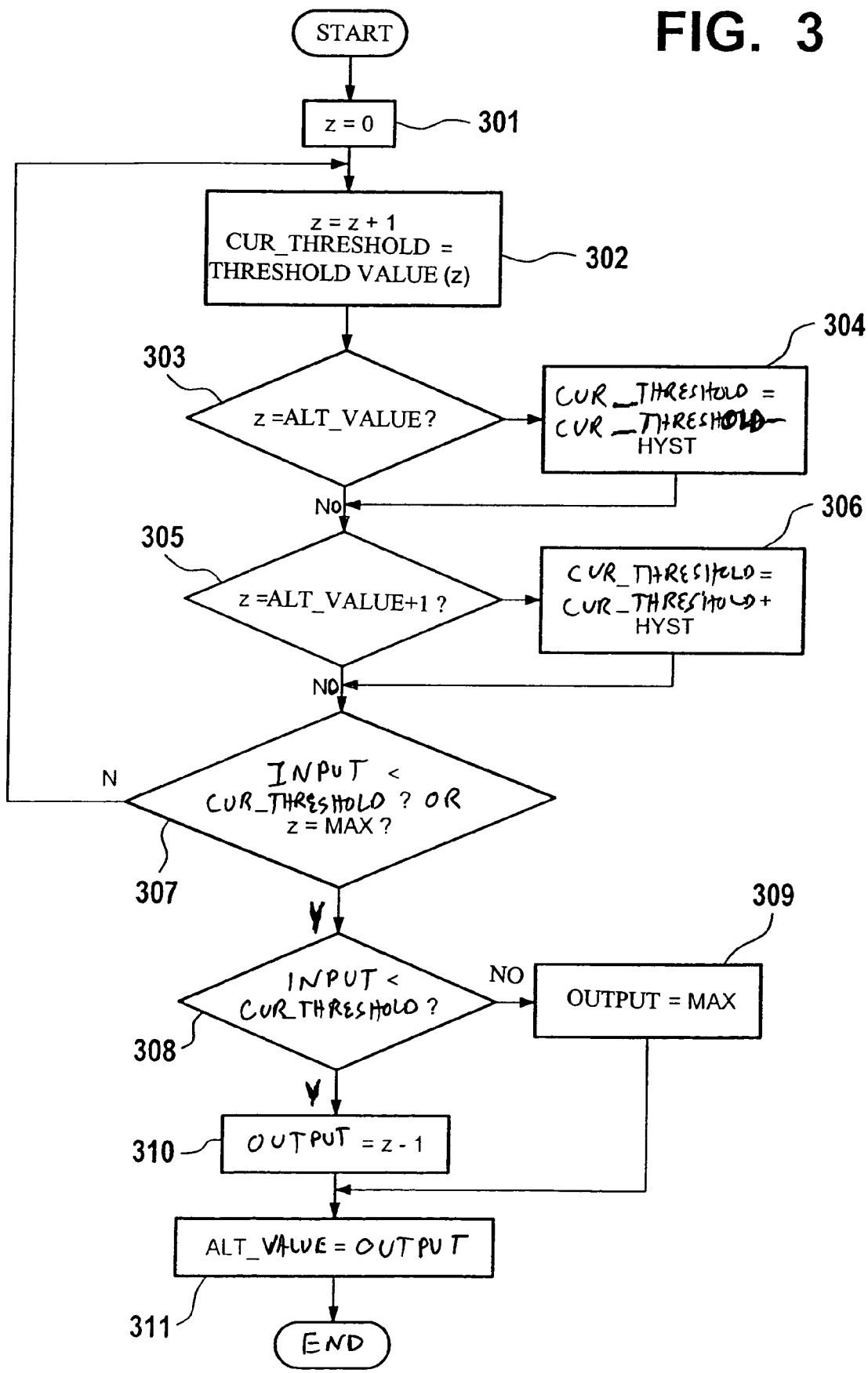
FIG. 3 shows a quantization algorithm with a hysteresis as a flow chart.

FIG. 3 shows, as a flow chart, a quantization algorithm that utilizes hysteresis values. In a first step 301, a counter z is initialized with zero. In a further step 302, counter z is incremented by one, and the value of the threshold value that belongs to counter z is assigned to variable CUR_THRESHOLD. In a query 303, counter z is compared with a value ALT_VALUE. If the values match, the current threshold is reduced by one hysteresis value in a step 304. As a result, for the case in which the value to be quantized was previously located above the current threshold value and now could be located below this value, one hysteresis of the lower threshold value is reached. If different hysteresis values are to be used for various values of the threshold value stored in variable CUR_THRESHOLD, a hysteresis value that is a function of counter z must be subtracted in step 304.

In a subsequent query 305, counter z is compared with a value ALT_VALUE that has been increased by one. If the values to be compared match, the current threshold value is increased by one hysteresis value in a step 306. As a result, for the case in which the value to be quantized was previously located below the current threshold and now could be located above this threshold, a hysteresis of the upper threshold value is reached. A hysteresis value that is a function of counter z must be added in step 306 if other hysteresis values are to be used for each threshold value.

In a subsequent query 307, a check is carried out to determine whether the input is less than current threshold value CUR_THRESHOLD, or whether counter z corresponds to a maximum value. If not, the process returns to step 302. In a further query 308, another check is carried out to determine whether the input is less than variable CUR_THRESHOLD. If not, a maximum value of the qualitative values is assigned to the output in step 309. This corresponds to the case in which the input is greater than the maximum quantitative value. In the other case, the value z−1 is assigned to the output as the qualitative value in step 310. Finally, in a step 311, variable ALT_VALUE is assigned the qualitative value that is now current.

Figure 4:
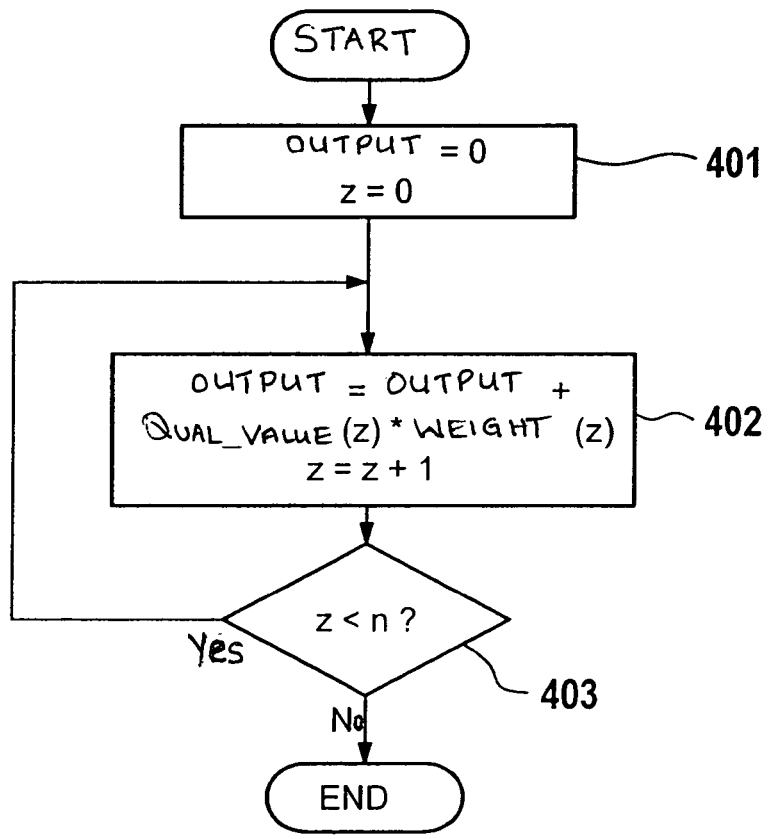
FIG. 4 shows a concentration algorithm as a flow chart.

FIG. 4 shows, in a flow chart, a concentration algorithm that forms a single qualitative value out of n qualitative values by forming a sum of the weighted n qualitative values. In a first step 401, a variable OUTPUT and a counter z are initialized with zero. In the subsequent step 402, counter z is incremented by one, and qualitative value QUAL_VALUE(z) multiplied by a weighting function WEIGHT(z) is added to variable OUTPUT. In a query 403, if counter z is less than the number n of qualitative values QUAL_VALUE, the process returns to step 402. The output value of the algorithm that results is unambiguous for a number of qualitative input values. This is achieved, for example, when the weighting function for the nth qualitative value is the product of all maximum qualitative values of 1 through n−1.

Figure 5:
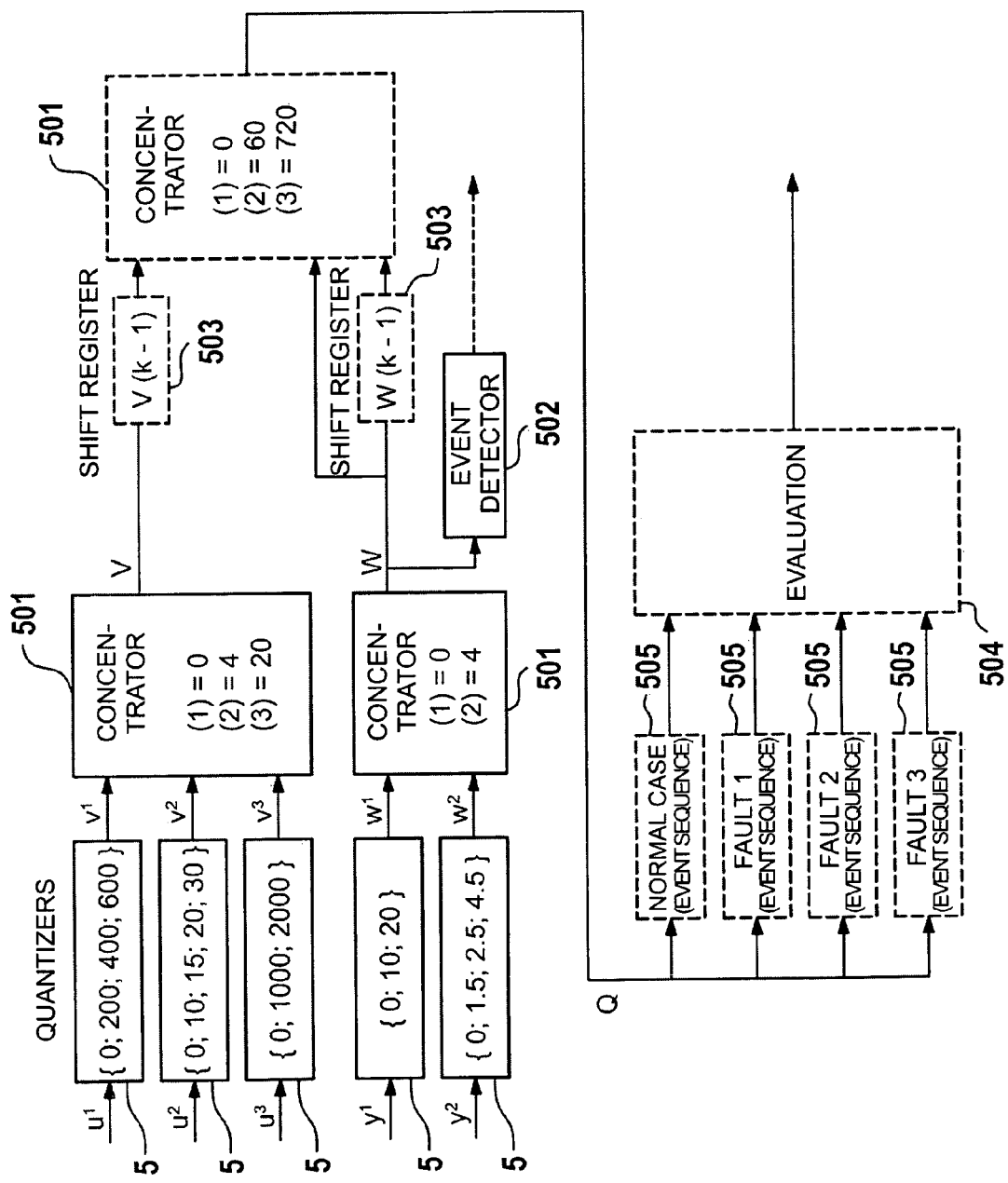
FIG. 5 shows, as a block diagram, the entire sequence of the exemplary method according to the present invention.

FIG. 5 shows, as a block diagram, the entire sequence of the exemplary method according to the present invention. The exemplary embodiment and/or method according to the present invention uses three input signals u1, u2, u3 and two output signals y1, y2. Input signals u1, u2, u3 are converted, in quantizers 5, to qualitative signals v1, v2, v3. Quantizers 5 utilize the algorithm explained in FIG. 3 for this purpose. The numerical sequences shown in parentheses in the quantizers represent the sequence of threshold values, each starting with zero. Likewise, output signals y1, y2 are converted to qualitative signals w1, w2 in quantizers 5.

The three qualitative input signals v1, v2, v3 are combined to form a single qualitative input signal V in a concentrator block 501 in which an algorithm according to FIG. 4 takes place. The three values shown represent the weighting values that are each assigned to counter z. Likewise, qualitative output signals w1, w2 are combined in a concentrator block 501 to form one qualitative value, i.e., output signal W. The weighting values are indicated in this case as well.

In the present example, events are detected by an event detector 502 as a change in a qualitative value in the case of qualitative output signal W. Event detector 502 recognizes an event as a change in qualitative value W. If an event occurs, qualitative value W, its previous value W (k−1), and the previous qualitative value V (k−1) are forwarded to a further concentrator block 501. The previous values W (k−1), V (k−1) are stored in shift registers 503.

All of the blocks shown in FIG. 5 using dashed lines are triggered by events, i.e., they do not become active until event detector 502 signals an event. A scalar weighting variable Q is formed from the three qualitative values W, W (k−1) and V (k−1), which also store an event sequence via their sequence. In sequence, a test block 505 checks weighting variable Q for conformance with a model for the normal case, and three test blocks 505 check for conformance with models for fault cases.

In the present example, the method therefore has three fault models. Since it is only necessary here to test for conformance using a scalar variable Q and not tuples, the possible values in the models may be sorted, and a search may be carried out logarithmically to determine whether Q is contained in the particular model.

The result is evaluated in an evaluation block 504. A fault status is then output. In the present example this is a vector, in the case of which a bit is set by each test block whose model contains Q. In evaluation block 504, for example, if a fault model applied previously, and even if the normal case model now applies to value Q, a fault may continue to be signaled, until the normal case model applies up to at least two times in a row.

If none of the test blocks signals a match, an indeterminate fault is output as the fault status. By utilizing the chronologically sequential results of the comparison step for the evaluation and fault determination, an undefined fault may still also be recognized, for example, when a fault A is first obtained as the result of the comparison, followed immediately by a fault B. Adapted rules for fault recognition may therefore be created, according to which, for example, after an indeterminate fault, the normal state may be returned to directly, but, after a certain fault, the normal model must result from the comparison at least a second time before the presence of the normal state is recognized.

The further processing is simplified considerably using the method described, which uses a two-fold combination. Events that occur with unnecessary frequency are avoided using the hysteresis in quantizers 5. Faults that occur briefly may be dealt with by considering the sequence of results of the comparison in evaluation block 504.

Figure 6:
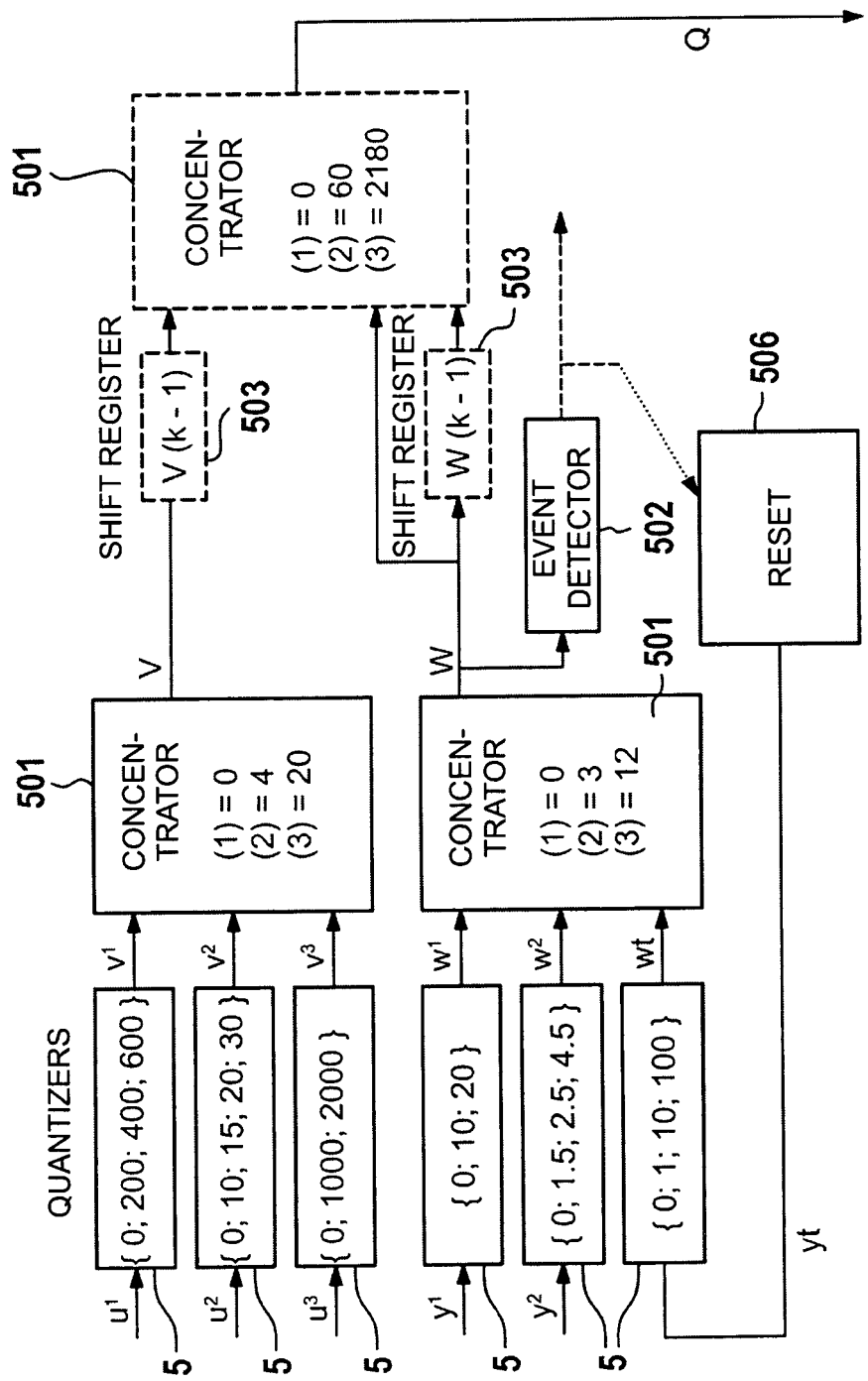
FIG. 6 shows, as a block diagram, part of the sequence of a further exemplary embodiment and/or method according to the present invention.

A block diagram is shown in FIG. 6, which shows part of the sequence of a further exemplary embodiment and/or method according to the present invention. The same reference numerals are used as in the exemplary embodiment in FIG. 5 where the methods are the same.

The method uses input signals u1, u2, u3 and output signals y1, y2. Input signals u1, u2, u3 are converted in quantizers 5 to qualitative signals v1, v2, v3. Likewise, output signals y1, y2 are converted in quantizers 5 to qualitative signals w1, w2.

In addition, a further output signal yt is present; it is converted to qualitative output signal wt. Qualitative input signals v1, v2, v3 are combined in a concentrator block 501, in which an algorithm takes place in accordance with FIG. 4, to form a single qualitative input signal V. The three values shown each represent the weighting values assigned to counter z. Likewise, qualitative output signals w1, w2, wt are combined in a concentrator block 501 to form a qualitative value W. The weighting values are also indicated here. Scalar value Q is also formed here as described herein above. In contrast to the exemplary embodiment in FIG. 5, event detector 502 sends a signal to a reset block, which sets a timer to zero. Elapsed time t is then used as the further output signal yt mentioned herein above.

As a result, cases in which a time has been exceeded or not met may also be recognized as faults. In particular, the method for detecting time faults of this nature need not be substantially changed, since the further processing of output signal yt takes place analogously to the processing of all other input or output signals. The further processing of weighting variable Q corresponds to that of the exemplary embodiment according to FIG. 5, and is therefore not described in greater detail here.

LIST OF REFERENCE NUMERALS

1 Motor vehicle system
2 Dynamic system
3 Input variables
4 Output variable
5 Quantizer
6 Control device
7 Model
8 Result
9 Fault
10 Pressure curve
11 Upper line
12 Lower line
301 Step
302 Step
303 Query
304 Step
305 Query
306 Step
307 Query
308 Query 309 Step
310 Step
311 Step
401 Step
402 Step
403 Query
501 Concentrator block
502 Event detector
503 Shift register
504 Evaluation block
505 Test block
506 Reset block
u1, u2, u3 input signals
y1, y2, yt output signals
v1, v2, v3 qualitative input signals
w1, w2, wt qualitative output signals in
V, W, Q combined variables

What is claimed is:

1. A method for monitoring a motor vehicle system having mechanical components and at least one control device, the method comprising:

detecting a plurality of input signals and a plurality of output signals as continuous-value signals that characterize the operating behavior of the motor vehicle system;

assigning discrete values to value intervals of the input signals and the output signals to form a plurality of discrete-value input signals and a plurality of discrete-value output signals, wherein the value intervals correspond to values between a plurality of pre-established thresholds, wherein at least one value interval is not equal in size to another value interval, wherein the discrete-value input signals are sequences of the discrete values that correspond to the values of the input signals, and wherein the discrete-value output signals are sequences of the discrete values that correspond to the values of the output signals;

combining the plurality of discrete-value input signals to form a single combined discrete-value input signal and combining the plurality of discrete-value output signals to form a single combined discrete-value output signal;

detecting as an event a change to at least one of: the single combined discrete-value input signal or the single combined discrete-value output signal;

storing consecutive events as at least one signal event sequence;

comparing the at least one signal event sequence with at least one normal model comprising at least one normal event sequence, wherein the normal model is of a normal behavior of the motor vehicle system, and if the at least one signal event sequence matches the at least one normal event sequence then a determination is made that the motor vehicle system is operating properly, and if the at least one signal event sequence does not match the at least one normal event sequence then a determination is made that the motor vehicle system is operating erroneously.

2. The method of claim 1, wherein the at least one signal event sequence is compared with at least one fault model of the motor vehicle system, the at least one fault model comprising at least one fault event sequence which is associatable with a particular fault, and if there is a match, a presence of the particular fault is recognized.

3. The method of claim 2, wherein:

a presence of an unknown fault is recognized if at least one of: the at least one signal event sequence matches the at least one fault event sequence of more than one fault model, or the at least one signal event sequence matches both the at least one normal event sequence of the normal model and the at least one fault event sequence of at least one fault model; and a presence of an indeterminate fault is recognized if the at least one signal event sequence does not match any of: the at least one normal event sequence of the normal model, and the at least one fault event sequence of any of the at least one fault models.

4. The method of claim 1, wherein at least two consecutive results of the comparing are compared with each other and this comparison is taken into consideration in determining whether a fault is present.

5. The method of claim 1, further comprising:

recording a time that has elapsed since an event occurred as a continuous-value time output signal, the continuous-value time output signal being one of the plurality of output signals;

assigning discrete values to value intervals of the time output signal to form discrete-value time output signal, wherein the discrete values are established using a particular sequence of threshold values, up to a maximum value, corresponding to the time output signal; and wherein the combining the plurality of discrete-value output signals to form a single combined discrete-value output signal includes combining the discrete-value time output signal as part of the plurality of discrete-value output signals.

6. The method of claim 1, wherein the single combined discrete-value input signal is uniquely assignable to the original values of the plurality of discrete-value input signals, and the single combined discrete-value output signal is uniquely assignable to the original values of the plurality of discrete-value output signals.

7. The method of claim 1, wherein the plurality of discrete-value input and output signals are respectively combined as weighted sums.

8. The method of claim 1, wherein the single combined discrete-value input signal and the single combined discrete-value output signal are combined to form a single combined discrete value input-output signal.

9. The method of claim 1, wherein, in the assigning, the threshold values of a previous value interval are reduced by a lower hysteresis value and increased by an upper hysteresis value.

10. A monitoring device for a motor vehicle system, including mechanical components and at least one control device, the monitoring device comprising:

an monitoring arrangement to monitor the motor vehicle system by performing the following:

detecting input signals and output signals as quantitative signals that characterize the operating behavior of the motor vehicle system;

assigning discrete qualitative values to value intervals of the input signals and the output signals to form a plurality of discrete-value input signals and a plurality of discrete-value output signals, wherein the value intervals correspond to values between a plurality of pre-established thresholds, wherein at least one value interval is not equal in size to another value interval, wherein the discrete-value input signals are sequences of the discrete values that correspond to the values of the input signals, and wherein the discrete-value output signals are sequences of the discrete values that correspond to the values of the output signals;

detecting a change to at least one of the qualitative values as an event;

storing consecutive events as at least one event sequence;

comparing the at least one stored event sequence with at least one model, each of which is composed of at least one event sequence, wherein the model is of a normal behavior of the motor vehicle system, and if the at least one stored event sequence matches the model of the normal behavior, then it is assumed that the motor vehicle system is operating properly, and erroneous operation is assumed if they do not match.

11. The monitoring device of claim 10, wherein the motor vehicle system includes a fuel injection system for an internal combustion engine, a braking system, or a by-wire system.

12. The method of claim 1, wherein the normal model is a complete normal model comprising all normal event sequences of a proper operation of the motor vehicle system.

13. The method of claim 1, wherein the at least one fault model is not a complete fault model, and does not include all fault event sequences of the motor vehicle system.

14. The method of claim 1, wherein the detecting detects as an event a change to the single combined discrete-value output signal.

15. The method of claim 8, wherein a previous value of the single combined discrete-value input signal, a previous value of the single combined discrete-value output signal, and a current value of the single combined discrete-value output signal are combined to form the single combined discrete value input-output signal.

16. The method of claim 1, further comprising:

recording a time that has elapsed since an event occurred as a continuous-value time output signal, the continuous-value time output signal being one of the plurality of output signals;

assigning discrete values to value intervals of the time output signal to form discrete-value time output signal, wherein the discrete values are established using a particular sequence of threshold values, up to a maximum value, corresponding to the time output signal;

wherein the combining the plurality of discrete-value output signals to form a single combined discrete-value output signal includes combining the discrete-value time output signal as part of the plurality of discrete-value output signals, wherein the at least one signal event sequence is compared with at least one fault model of the motor vehicle system, the at least one fault model comprising at least one fault event sequence which is associatable with a particular fault, and if there is a match, a presence of the particular fault is recognized, wherein a presence of an unknown fault is recognized if at least one of: the at least one signal event sequence matches the at least one fault event sequence of more than one fault model, or the at least one signal event sequence matches both the at least one normal event sequence of the normal model and the at least one fault event sequence of at least one fault model, wherein a presence of an indeterminate fault is recognized if the at least one signal event sequence does not match any of: the at least one normal event sequence of the normal model, and the at least one fault event sequence of any of the at least one fault models, and wherein, in the assigning, the threshold values of a previous value interval are reduced by a lower hysteresis value and increased by an upper hysteresis value.

17. The method of claim 1, wherein:

the single combined discrete-value input signal is uniquely assignable to the original values of the plurality of discrete-value input signals, and the single combined discrete-value output signal is uniquely assignable to the original values of the plurality of discrete-value output signals, the plurality of discrete-value input and output signals are respectively combined as weighted sums, and the single combined discrete-value input signal and the single combined discrete-value output signal are combined to form a single combined discrete value input-output signal.

18. The method of claim 1, wherein:

the normal model is a complete normal model comprising all normal event sequences of a proper operation of the motor vehicle system, the at least one fault model is not a complete fault model, and does not include all fault event sequences of the motor vehicle system, the detecting detects as an event a change to the single combined discrete-value output signal, and a previous value of the single combined discrete-value input signal, a previous value of the single combined discrete-value output signal, and a current value of the single combined discrete-value output signal are combined to form the single combined discrete value input-output signal.

19. The method of claim 16, wherein:

the single combined discrete-value input signal is uniquely assignable to the original values of the plurality of discrete-value input signals, and the single combined discrete-value output signal is uniquely assignable to the original values of the plurality of discrete-value output signals, the plurality of discrete-value input and output signals are respectively combined as weighted sums, the single combined discrete-value input signal and the single combined discrete-value output signal are combined to form a single combined discrete value input-output signal, the normal model is a complete normal model comprising all normal event sequences of a proper operation of the motor vehicle system, the at least one fault model is not a complete fault model, and does not include all fault event sequences of the motor vehicle system, the detecting detects as an event a change to the single combined discrete-value output signal, and a previous value of the single combined discrete-value input signal, a previous value of the single combined discrete-value output signal, and a current value of the single combined discrete-value output signal are combined to form the single combined discrete value input-output signal.

* * * * *